United States Patent
Azoulay

Patent Number: 5,443,544
Date of Patent: Aug. 22, 1995

[54] DEVICE FOR THE CONTINUOUS WATERING OF PLANTS

[76] Inventor: Serge Azoulay, 46, rue Barbès, 94200 Ivry-sur-Seine, France

[21] Appl. No.: 196,064
[22] PCT Filed: Aug. 7, 1992
[86] PCT No.: PCT/FR92/00780
  § 371 Date: Feb. 25, 1994
  § 102(e) Date: Feb. 25, 1994
[87] PCT Pub. No.: WO93/03605
  PCT Pub. Date: Mar. 4, 1993

[30] Foreign Application Priority Data
Aug. 26, 1991 [FR] France .............. 91 10600
Feb. 25, 1992 [FR] France .............. 92 02143

[51] Int. Cl.6 ............................................. A01G 29/00
[52] U.S. Cl. ................................... 47/48.5; 47/81
[58] Field of Search .......................... 47/48.5 G, 81

[56] References Cited

U.S. PATENT DOCUMENTS

| | | | |
|---|---|---|---|
| 2,791,347 | 5/1957 | Boehm | 47/48.5 G |
| 3,151,415 | 10/1964 | James | 47/48.5 G |
| 3,821,863 | 7/1974 | Chan | 47/48.5 G |
| 4,089,133 | 5/1978 | Duncan | 47/48.5 G |
| 4,300,309 | 11/1981 | Mincy | |
| 4,453,343 | 6/1984 | Grimes, Sr. | 47/48.5 G |
| 4,866,880 | 9/1989 | Weinblatt | 47/48.5 G |

FOREIGN PATENT DOCUMENTS

| | | | |
|---|---|---|---|
| 67411 | 8/1948 | Denmark | 47/48.5 G |
| 1176262 | 4/1959 | France | 47/48.5 G |
| 1217816 | 5/1960 | France | 47/48.5 G |
| 2576177 | 7/1986 | France | |
| 2605837 | 5/1988 | France | 47/48.5 G |
| 1907610 | 12/1964 | Germany | |
| 1926493 | 11/1965 | Germany | |
| 1993737 | 9/1968 | Germany | |
| 7241583 | 4/1973 | Germany | |
| 2249463 | 5/1992 | United Kingdom | 47/48.5 G |
| 1606034 | 11/1990 | U.S.S.R. | 47/48.5 G |

*Primary Examiner*—Ramon S. Britts
*Assistant Examiner*—Joanne C. Downs
*Attorney, Agent, or Firm*—Dennison, Meserole, Pollack & Scheiner

[57] ABSTRACT

A device for the continuous watering of plants, including a reservoir provided at its lower part with a base having at least one opening, the reservoir being connected by its base to a stabilization leg which contains an absorbing or filtering material and ends into a tapered soil penetration guide. The stabilization leg has at least one blade connected to a central hollow tube containing the absorbing or filtering material and having at least one opening provided for creating a communication between the absorbing or filtering material and the soil. The absorbing or filtering material is positioned in such a way that at least one wick connected to the reservoir and suspended above the absorbing or filtering material acts as a drip.

10 Claims, 4 Drawing Sheets

DEVICE FOR THE CONTINUOUS WATERING OF PLANTS

BACKGROUND OF THE INVENTION

The present invention relates to the continuous watering of plants.

Conventional methods and devices are already known for continuous watering or irrigation, some of which consist in:

regrouping plants on trays filled with water and gravel or on spongy mats impregnated with water, humidifying by capillarity between a bucket of water and the soil in the pot;

the use of bottles equipped with small pipes for feeding water to the soil of the plants by siphoning.

Said methods are tedious, long to implement, hardly reliable, uncertain and they require know-how, care and experience in order to be efficient.

Moreover, the different systems currently found on the market, make use of a distribution of water under pressure and are therefore more adapted to fixed garden equipments than to temporary fittings for momentarily ensuring the survival of indoor plants. Indeed, the corresponding installations are expensive, long to implement, rigid and cumbersome. In addition, they involve numerous connections to be fitted carefully and reliably, as any leaks could cause flooding due to the constant pressure prevailing inside the pipes and inside the different accessories.

SUMMARY OF THE INVENTION

It is the object of the present invention to solve satisfactorily the aforesaid technical problems.

This object is reached with a device for the continuous watering of plants, comprising a reservoir, provided at its lower part with a base having at least one opening, the reservoir being connected by its base to a stabilization leg which contains an absorbing or filtering material and ends with a tapered penetration guide, characterized in that the stabilization leg comprises at least one blade connected to a hollow central tube containing the absorbing or filtering material and on which at least one opening is provided for creating a communication between the absorbing or filtering material and the soil, said absorbing material being positioned in such a way that at least one wick connected to the reservoir and suspended above said absorbing or filtering material acts as a drip.

The device according to the invention can be produced with a reservoir made entirely from a plastic material which is hard, optionally transparent, and comprises a lid to prevent quick evaporation. This reservoir optionally comprises double walls which are empty or filled with glass-wool for longer retention of the water.

Said reservoir can take on various shapes (depending on the water reserves necessary). It may comprise several filters (depending on the volume of water needed by the plant). The device according to the invention is easy to implement and economical, and with it, mechanical stability is improved even in loose soil.

The invention will be more readily understood on reading the following description given with reference to the accompanying drawings.

DESCRIPTION OF PREFERRED EMBODIMENTS

Figure 1A:
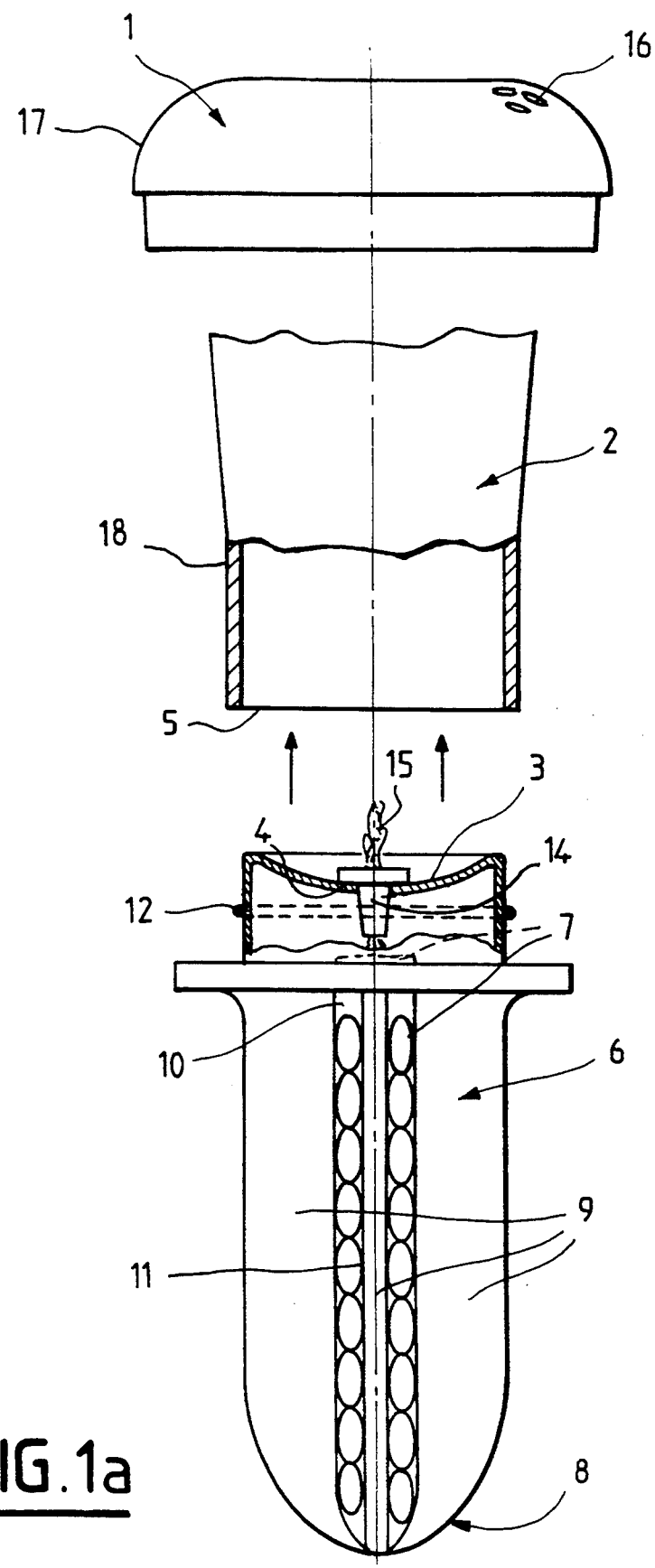
FIGS. 1a and 1b illustrate views partially in cross-sectional of one embodiment of the device according to the invention, respectively before and after assembly.
Figure 1B:
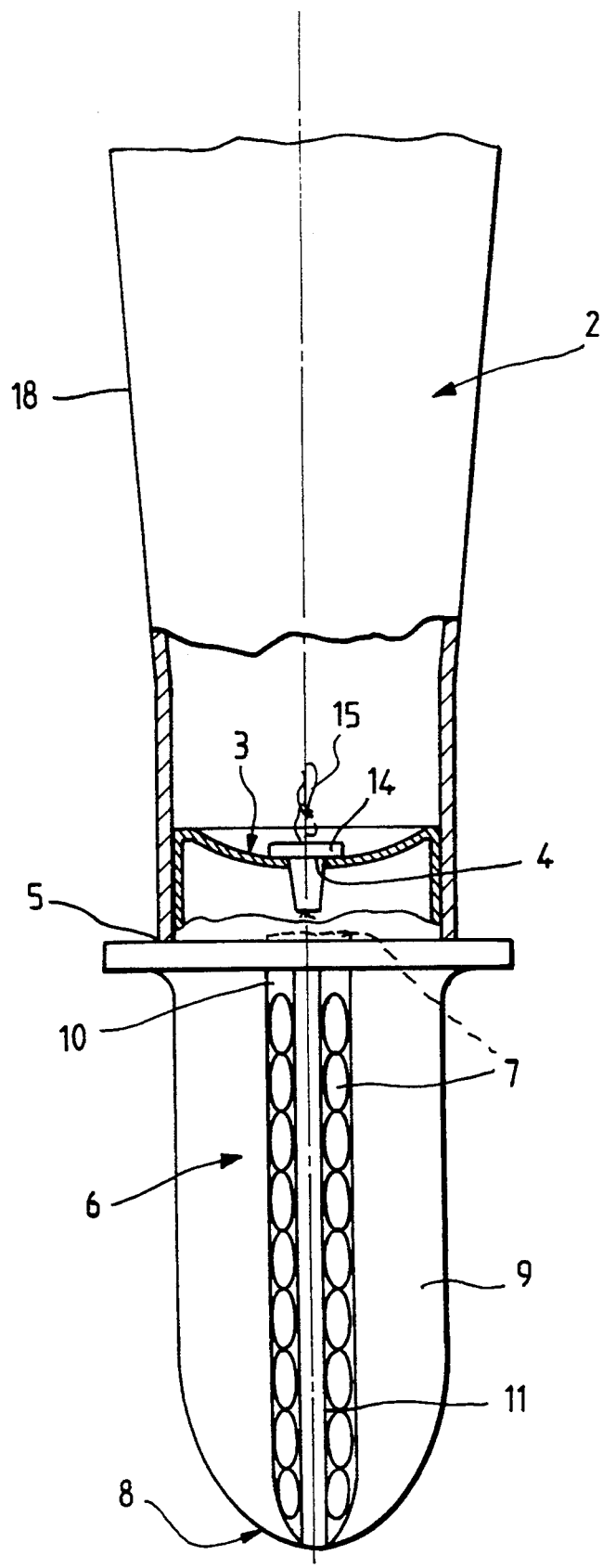
Figure 2:
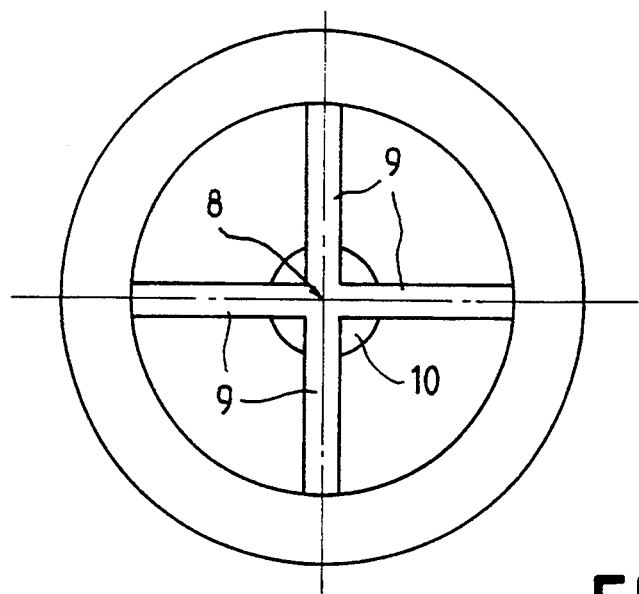
FIG. 2 illustrates a bottom plan view of the device of FIG. 1.

A device 1 for the continuous watering of plants according to the invention, is illustrates in FIG. 1a and 1b and comprises, in combination, a reservoir 2 having a lower edge portion 5 engaged with a base 3 having at least one opening 4. The reservoir is connected by the base 3 to a stabilization leg 6 containing an absorbing or filtering material 7 and ending into a tapered penetration guide 8. Said stabilization leg 6 comprises at least one blade 9, connected to a hollow tube 10. Said hollow tube 10 receives on the inside the absorbing material 7. Said hollow tube is advantageously provided laterally of each blade 9 with at least one opening 11, thus enabling the absorbing material 7 to be in communication with the soil by immediate contact, when the leg 6 is driven into the pot.

Generally, the stabilization leg 6 comprises four blades 9 disposed radially at the periphery of the tube 10. Said blades are therefore interconnected axially at one of their edges by said hollow tube 10. Said hollow tube 10 contains the absorbing material 7. Said hollow tube 10 is provided between said four blades with a row of holes 11 or with a longitudinal slot thus enabling the absorbing material 7 to be in direct communication with the soil when the leg 6 is driven into the pot. It is important that said rows of holes 11 allow a direct contact between at least part of the absorbing material 7 and the soil into which the stabilization leg 6 is sunk. The reservoir and the stabilization leg are joined together in a conventional way, for example by being inserted one into the other; tightness being achieved by means of an O-ring 12, by screwing or by clipping.

As illustrated in FIGS. 1a and 1b, the upper face of the base 3 is concave. The opening 4 in the base 3 is advantageously traversed by two rigid or supple threaded half-shells 14. Said two threaded half-shells 14 tightly enclose at least one wick 15.

The wick 15 projects slightly from the lower end of the two threaded half-shells, and is spaced at a distance from the absorbing material 7 contained axially in the stabilization leg 6. The wick 15 is synthetic material and, preferably, containing polyester. Normally, the size of the wick 15 ranges between 1 and 5 cm.

The absorbing material 7 is preferably a water-absorbing sponge or foam, advantageously constituted of a permeable synthetic material (such as polyurethane foam or open-celled expanded polystyrene). The reservoir 2, the blades 9, and the hollow tube 10 are preferably produced in plastic material. The reservoir 2 is advantageously provided with a lid 17 having one or more holes 16. The reservoir can comprise a double wall 18 and generally has a capacity ranging between 0.5 and 10 liters.

To obtain a continuous watering of plants with a device according to the invention, the stabilization leg 6 is driven into the soil, proximate to the plant or plants to be watered.

Figure 3:
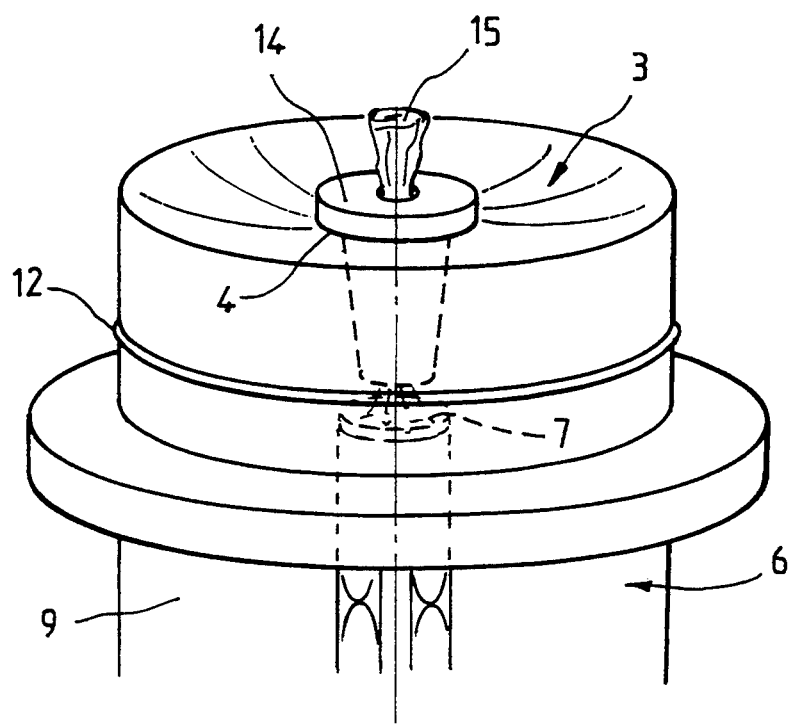
FIG. 3 illustrates a perspective detail of the device of the invention.

Due to the tapered penetration guide 8, the planting into the soil is easily done. The reservoir 2 is filled with water or with an aqueous solution such as for example an aqueous solution of mineral salts. The water or aqueous solution flows dropwise (see FIG. 3) through the opening 4 of the base 3 of the reservoir 2, while passing through the wick 15 clasped between the threaded half-shells 14. The drops of liquid fall onto the absorbing material 7 contained in the hollow tube 10 fixed axially in the stabilization leg 6. The wick 15 as well as the half-shells 14 clasping it (FIG. 3) are positioned above said absorbing material 7 whereby the absorbing material 7 receives, in the best possible way, the liquid dripping from the reservoir.

This liquid spreads along the absorbing material 7 and then reaches the soil which is moistened under its contact.

A particularly advantageous feature is that the opening 4 at the base 3 of the reservoir 2 is traversed by threaded half-shells 14 tightly enclosing the wick 15. Indeed, the wick 15 of which the upper end is immersed in the liquid of the reservoir 2, facilitates a great deal, the controlled drop-by-drop supply of the liquid on the absorbing material 7.

The base 3 of the reservoir 2 is independent of the latter and fast with the upper part of the stabilization leg 6. As a variant, said base 3 can also be provided so as to be fast with the reservoir 2 at a slight distance from its lower edge portion 5 so as to define the elastically insertable (assembly by clipping or bayonet fitting) or threaded base.

According to yet another variant or embodiment, the base 3 is produced in the form of a separate removable piece insertable in a corresponding housing provided at the upper part of the leg 6 and topped with the reservoir 2. In this latter case, the base 3 with the wick 15 are held in operating position by the reservoir 2 resting on the leg 6, said resting position being reinforced by the pressure of the liquid in said reservoir 2.

Figure 5:
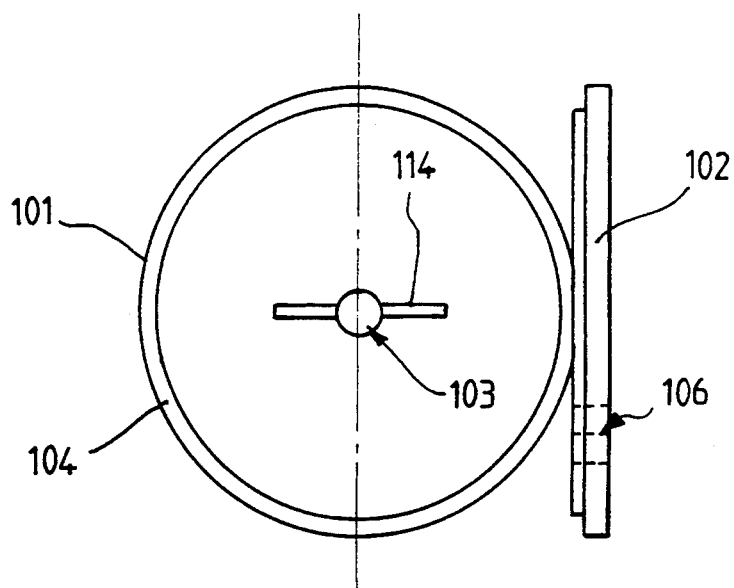
FIG. 5 illustrates a top plan view of the device of FIG. 4 with the lid open.
Figure 4:
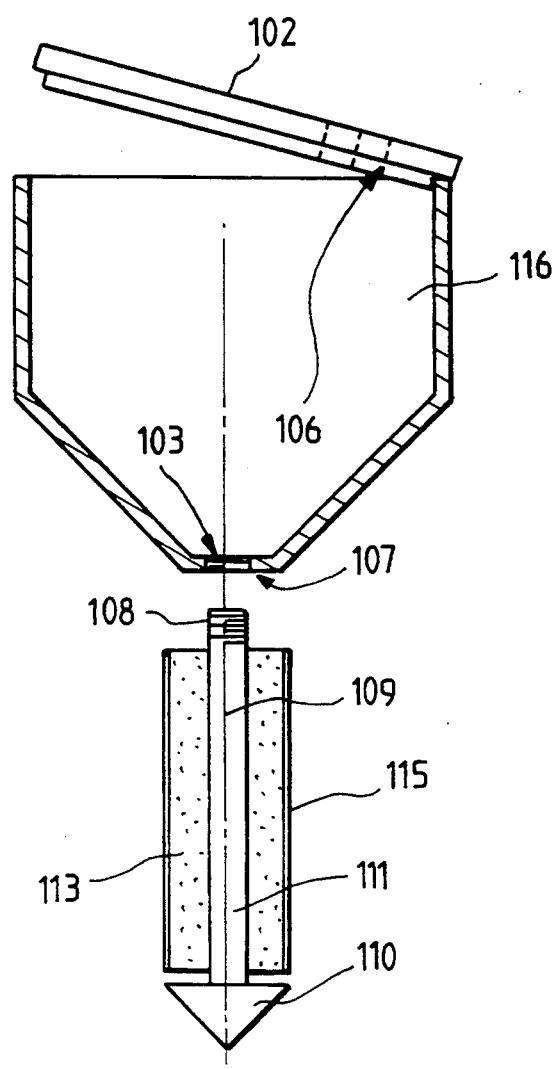
FIG. 4 illustrates a partial cross-section of another embodiment of the invention.

FIGS. 4 and 5 illustrate another embodiment of the invention in which a blade fast with a pointed or tapered guide is screwed under the base of said reservoir, thereby making it easier to drive the device into the soil. Prior to this, a dismountable filter is fitted over said blade. The assembly is screwed under the reservoir of water, under which thin slots are created in order to temporize the drip of water towards the filter. Said filter, which is entirely made of plastic material, comprises two screens compressing a felt cloth which, when the device is assembled, comes to nest into two slots provided under the reservoir of water.

It is worth noting that the watering will be performed permanently in small continuous doses.

FIG. 5 illustrates the walls 101, 104 of the plastic reservoir 116 which has, like the reservoir 2, double walls which can remain empty or contain glass-wool 105.

The device illustrated in FIGS. 4 and 5 comprise in combination, the reservoir of water 116 connected at its lower part to a leg constituted of a small blade 109 and of a guide 110 supporting a filter 113 adapted to be brought into immediate contact with the soil by being driven into the pot. The reservoir 116 is equipped with a lid 102 provided with holes 106 to help the water to go down towards the filter 113.

The watering device according to FIG. 4 further comprises an inlaid female nut 103 adapted to receive the threading 108 when the device is finally assembled. Before this, the blade 109 will receive a hollow tube or conduit 111 which, together with the base portion 107 of the reservoir, will make it possible to hold efficiently the filter 113. Said latter will, when the device is assembled, come into abutment at its lower end against the guide 110, and in facing relationship at its upper end to the reservoir and to the shoulder piece 114. The filter 113 is likewise made of plastic material and is constituted of two screens 115 clasping a felt cloth which is provided on its upper sides with slots to enable the water flowing from the reserve 116 to come into immediate contact with the felt cloth whose role it is to supply the plant with water.

The filter 113 comprises two flat sides in order to make it easier for the plant to absorb the water, said flat sides being joined to a central part designed to be threaded over the blade 109 and to be protected laterally by the two screens 115.

The reservoir as well as its lid 102 comprise double walls 101, 104 thereby enabling a longer watering time due to the insulation which limits the evaporation of the water.

The reservoir is provided at its base with stop means for positioning the opening 106 of the reservoir 116 in aligned facing relationship to the filter 113.

The guide 110 is provided laterally with triangular faces of which the base situated horizontally upwardly, corresponds substantially to the width of the filter 113 and of the screen 115 containing it, while the thickness between its lateral faces corresponds substantially to the thickness of the filter 113 and of the screen 115 containing it.

Said thickness reduces towards the point of the guide in order to help its penetration into the soil and to define the position of the filter.

What is claimed is:

1. A device for the continuous watering of plants, comprising a reservoir provided with a base having at least one opening defined therein, an elongate stabilization leg joined to said reservoir by said base, said stabilization leg, longitudinally remote from said base, terminating in a tapered soil penetration guide, said stabilization leg comprising a central hollow tube aligned with said at least one opening and containing an absorbing material, at least one blade fixed to said tube and extending laterally therefrom, said central hollow tube having a longitudinal aperture defined therein and offset from said at least one blade, at least one wick extending through said opening in said base and extending below said opening to a point in spaced relation above said absorbing material for a drip transfer of watering liquid from said reservoir to said absorbing material in said central hollow tube for subsequent distribution to the plant through said longitudinal aperture in a controlled manner.

2. The device as claimed in claim 1 including two opposed half-shells clamped about said wick and fixed within said opening in said base for a fixed positioning of said wick therein.

3. The device as claimed in claim 1 wherein said at least one blade comprises multiple blades connected to and extending axially along said central hollow tube at peripherally spaced points thereabout.

4. The device as claimed in claim 3 wherein said blades are substantially longitudinally coextensive with said stabilization leg.

5. The device as claimed in claim 4 wherein additional longitudinal apertures are provided, said apertures being positioned with at least one between each pair of adjacent blades.

6. The device as claimed in claim 5 wherein said apertures are substantially longitudinally coextensive with said stabilization leg.

7. The device as claimed in claim 5 wherein said base has a concave upper face above which said wick projects for extension of said wick into said reservoir.

8. The device as claimed in claim 1 wherein said base has a concave upper face above which said wick projects for extension of said wick into said reservoir.

9. The device as claimed in claim 1 wherein said wick is of a synthetic material.

10. The device as claimed in claim 1 wherein said absorbing material is of a sponge-like material.

* * * * *